(12) United States Patent
Kim

(10) Patent No.: US 12,548,659 B2
(45) Date of Patent: Feb. 10, 2026

(54) SYNTHETIC CT USING MRI

(71) Applicant: Virginia Commonwealth University, Richmond, VA (US)

(72) Inventor: Siyong Kim, Glen Allen, VA (US)

(73) Assignee: Virginia Commonwealth University, Richmond, VA (US)

(*) Notice: Subject to any disclaimer, the term of this patent is extended or adjusted under 35 U.S.C. 154(b) by 395 days.

(21) Appl. No.: 17/925,538

(22) PCT Filed: Apr. 28, 2021

(86) PCT No.: PCT/US2021/029558
§ 371 (c)(1),
(2) Date: Nov. 15, 2022

(87) PCT Pub. No.: WO2021/236306
PCT Pub. Date: Nov. 25, 2021

(65) Prior Publication Data
US 2023/0197249 A1 Jun. 22, 2023

Related U.S. Application Data

(60) Provisional application No. 63/028,701, filed on May 22, 2020.

(51) Int. Cl.
*G16H 30/40* (2018.01)
*A61B 5/055* (2006.01)
(Continued)

(52) U.S. Cl.
CPC .............. *G16H 30/40* (2018.01); *A61B 5/055* (2013.01); *G06N 3/0464* (2023.01); *G06T 11/60* (2013.01); *G06T 2210/41* (2013.01)

(58) Field of Classification Search
CPC ........ G16H 30/40; G16H 50/20; A61B 5/055; A61B 6/032; G06N 3/0464; G06N 3/045;
(Continued)

(56) References Cited

U.S. PATENT DOCUMENTS

2017/0178391 A1* 6/2017 Svensson ............... G16H 50/50
2019/0362522 A1* 11/2019 Han ........................ G06T 11/00
(Continued)

FOREIGN PATENT DOCUMENTS

WO 2020028383 A1 2/2020

OTHER PUBLICATIONS

Huang, Yixing, et al. "Field of view extension in computed tomography using deep learning prior." Bildverarbeitung für die Medizin 2020: Algorithmen-Systeme-Anwendungen. Proceedings des Workshops vom 15. bis 17. Mar. 2020 in Berlin. Springer Fachmedien Wiesbaden, 2020. https://arxiv.org/abs/1911.01178 (Year: 2020).*

(Continued)

*Primary Examiner* — Matthew C Bella
*Assistant Examiner* — Andrew B. Jones
(74) *Attorney, Agent, or Firm* — Thomas | Horstemeyer, LLP

(57) ABSTRACT

Disclosed are various approaches for generating synthetic computer tomography (CT) images using magnetic resonance imaging A patient body outline (PBO) of a patient is obtained. Then, a magnetic resonance image set in a limited field of view (MRI-in-LFOV) of the patient is converted into a synthetic computed tomography (CT) image set in limited field of view (syn-CT-in-LFOV) of the patient. Next, the syn-CT-in-LFOV is expanded to a synthetic CT image set in full field of view (syn-CT-in-FFOV) of the patient based at least in part on the PBO.

12 Claims, 3 Drawing Sheets

(51) Int. Cl.
  *G06N 3/0464*   (2023.01)
  *G06T 11/60*    (2006.01)
(58) Field of Classification Search
  CPC .......... G06N 20/00; G06N 3/08; G06T 11/60;
                 G06T 2210/41; A61N 5/103
  See application file for complete search history.

(56) References Cited

U.S. PATENT DOCUMENTS

| | | | |
|---|---|---|---|
| 2019/0369030 A1 | 12/2019 | Wu et al. | |
| 2020/0105394 A1 | 4/2020 | Laaksonen et al. | |
| 2021/0358119 A1* | 11/2021 | Vahala | G06T 11/006 |
| 2022/0207727 A1* | 6/2022 | Svensson | G06T 7/70 |
| 2022/0230304 A1* | 7/2022 | Eriksson | G06T 19/20 |
| 2022/0230319 A1* | 7/2022 | Andersson | G06T 7/0016 |

OTHER PUBLICATIONS

Kim et al. "Generation of tissues outside the field of view (FOV) of radiation therapy simulation imaging based on machine learning and patient body outline (PBO)"; Jan. 16, 2023.

Kim et al. "Artificial intelligence (AI) based missing tissue generated synthetic CT preparation for planning in limited field of view (LFOV) MR-only simulation"; Mar. 4, 2021.

International Search Report mailed Aug. 17, 2021.

Lei et al. "MRI-only based synthetic CT generation using dense cycle consistent generative adversarial networks", May 21, 2019 (May 21, 2019). [retrieved on Jul. 20, 2021]. Retrieved from the Internet: <URL: https://aapm.onlinelibrary.wiley.com/doi/am-pdf/10.1002/mp.13617> entire document.

Fu et al. "Deep learning approaches using 2D and 3D convolutional neural networks for generating male pelvic synthetic computed tomography from magnetic resonance imaging", Jun. 10, 2019 (Jun. 10, 2019). [retrieved on Jul. 20, 2021]. Retrieved from the Internet: <URL: https://aapm.onlinelibrary.wiley.com/doi/pdfdirect/10.1002/mp.13672> pp. 3788-3798.

Johnstone et al. "Systematic Review of Synthetic Computed Tomography Generation Methodologies for Use in Magnetic Resonance Imaging—Only Radiation Therapy", Jan. 1, 2018 (Jan. 1, 2018). [retrieved on Jul. 20, 2021]. Retrieved from the Internet: <URL: https://eprints.whiterose.ac.uk/121200/1/1-s2.0-S0360301617338403-main.pdf>.

* cited by examiner

SYNTHETIC CT USING MRI

CROSS-REFERENCE TO RELATED APPLICATIONS

This application is the 35 U.S.C. § 371 national stage application of PCT Application No. PCT/US2021/029558, filed Apr. 28, 2021, where the PCT claims priority to and the benefit of, U.S. Provisional Patent Application No. 63/028,701, entitled "SYNTHETIC CT USING MRI" and filed on May 22, 2020, both of which are herein incorporated by reference in their entireties.

BACKGROUND

Computer tomography (CT) has the advantage of offering accurate representation of patient geometry and providing CT values that can be directly converted to electron densities for radiation dose calculation, which is indispensable for dosage planning in radiotherapy treatment of cancer patients. However, CT images suffer from limited soft tissue contrast, it is often hard to identify tumors and adjacent normal tissues.

Compared to CT, on the other hand, Magnetic Resonance Imaging (MRI) provides superior soft tissue contrast, which helps treatment team clearly delineate both target boundaries and neighboring critical structures, called organs at risk (OARs) in radiation therapy. More accurate target delineation with MRI compared with CT would improve the quality of radiation treatment planning. Furthermore, MRI is a multi-parametric imaging modality that can provide not only anatomical information with high soft tissue contrast, but also valuable functional information for disease progression assessment and treatment response evaluation. Another advantage MRI has is that it adds no imaging radiation dose to patients.

Radiation treatment planning frequently uses both CT and MRI for many disease sites. In general, while a planning CT scan is used as the primary image set where dose calculation is performed, an MR image is used as secondary image modality for contouring tumors/organs of interest after an image is registered to the primary image set (i.e., the CT image set). One of the biggest challenges in this approach is the potential of systematic error existing in image registration between images, especially from two different image modalities.

Obviously, such concern can be eliminated if MR image sets can be directly used for treatment planning with no CT imaging. Through MRI based radiation treatment planning, for instance, anatomic and functional imaging can all be performed during the same imaging session, thereby reducing image registration errors.

In recent years, interests in replacing CT with MRI in the treatment planning process have grown rapidly. MRI is a safe imaging modality that provides more anatomical details than CT for diagnostic purposes, but unfortunately cannot directly provide electron density information necessary for both dose calculation and attenuation correction. Therefore, implementing MRI-guided radiotherapy in clinic requires a method to derive CT equivalent information or electron density distribution from an MR image for radiation dose calculation. Such CT equivalent data are usually referred to as synthetic-CT (syn-CT) or pseudo-CT images and a fair number of research groups demonstrated promising results of syn-CT generation. So far, there have been 3 distinct approaches of generating syn-CTs from MRI, image intensity based, atlas based, and deep learning-based.

However, all of the currently commercially available MRI units have smaller bore sizes (~70 cm) than those (80 to 90 cm) that most simulation CTs have. Thus, typical MR maximum field of view (FOV) is often not large enough (~50 cm) to cover the whole object (e.g. abdomen, chest or pelvis) of large size patients. Accordingly, syn-CT images generated from MRI may not be able to provide whole body information necessary for accurate dose calculation when patient body sizes exceed the maximum FOV of MRI. To provide accurate dose computation, therefore, generating missing tissue outside of FOV should be considered.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for providing accurate dose computation by accounting for missing tissue outside the field of view of images generated by magnetic resonance imaging (MRI) machines. An optical or thermal image of a patient can be captured. The captured image can be overlaid on at least one image from a set of MRI in limited field of view (MRI-in-LFOV) images to generate a first portion of a patient body outline. Various machine learning approaches can be used to predict a second portion of the patient body outline. The two portions can be combined to generate a complete patient body outline. The set of MRI-in-LFOV images can then be converted into synthetic computed tomography limited field of view (Syn-CT-in-LFOV) using machine-learning approaches such as a convolutional neural network (CNN). Each Syn-CT-in-LFOV image can then be converted into a synthetic CT in full field-of-view (Syn-CT-in-FFOV) image based at least in part on the patient body outline. The Syn-CT-in-FFOV image(s) can then be used for diagnostic or therapeutic purposes, such as computing doses for radiation therapy.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples. It is understood that the flowcharts described herein can be performed using any computing device with appropriate computing resources.

Figure 1:
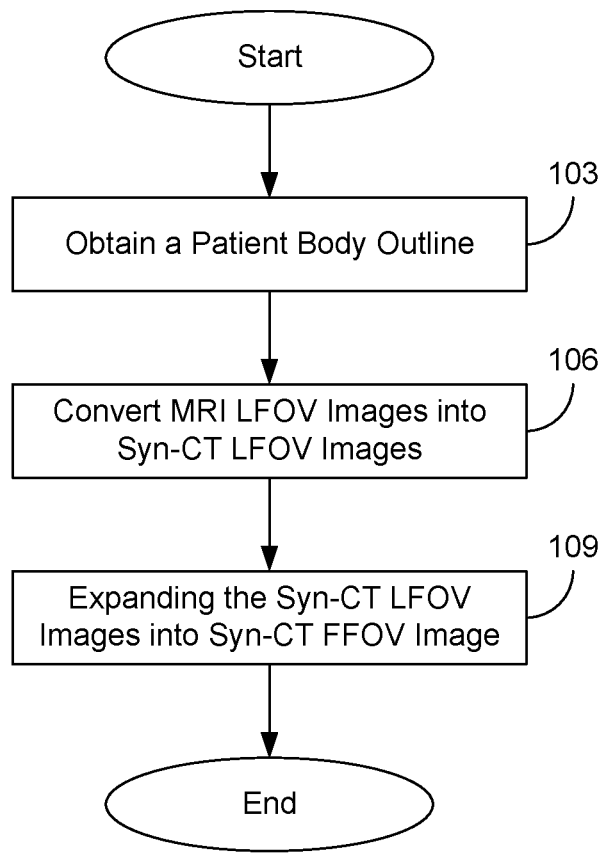
FIG. 1 is a flowchart illustrating one example of functionality implemented according to various embodiments of the present disclosure.

Referring next to FIG. 1, shown is a flowchart that provides one example of a method for implementing various embodiments of the present disclosure.

Beginning with block 103, a patient body outline (PBO) can be obtained or generated. The patient body outline can represent an outline of the contours of a patient's body from a particular perspective. For example, a side or lateral PBO could represent the outline of the contours of the body of the patient when viewed from the side. Other PBOs can represent the contours of the patient's body when viewed from the front, rear, top, or bottom of the patient. The PBO can be obtained from a variety of sources, such as a thermal or optical camera attached to, in data communication with, or used in conjunction with a magnetic resonance imaging (MRI) machine. Thermal imaging may be preferred in situations where the view of the patient's body is obstructed, such as may occur when the patient is covered by a sheet. If a portion of the PBO cannot be viewed, it may be predicted using various machine-learning approaches. A portion of the PBO might be unviewable for any number of reasons, such as an obstructed view due to the presence of a patient immobilization device.

Then at block 106, multiple MRI-in-LFOV images can be converted into multiple, respective Syn-CT-in-LFOV images. For example, the MRI-in-LFOV might be captured from an MRI machine imaging a patient, such as the same MRI machine used at block 103. The MRI-in-LFOV can be considered to be of limited field of view because of the limited bore-size of the MRI machine. For example, an MRI machine with a bore-size of 70 cm will only be able to view a portion of a patient that is 50 cm in width.

Next at block 109, one or more images of the Syn-CT-in-LFOV images are expanded to create respective Syn-CT-in-FFOV images. For example, a Syn-CT-in-LFOV may be combined with the PBO from block 103. A missing body generation algorithm could then be used as the basis for a prediction using a machine-learning algorithm or approach to predict the content of the portion of the PBO that was not imaged or represented by the MRI-in-LFOV or Syn-CT-in-LFOV images. The resulting image is a Syn-CT-in-FFOV, which can be used for various purposes.

Figure 2:
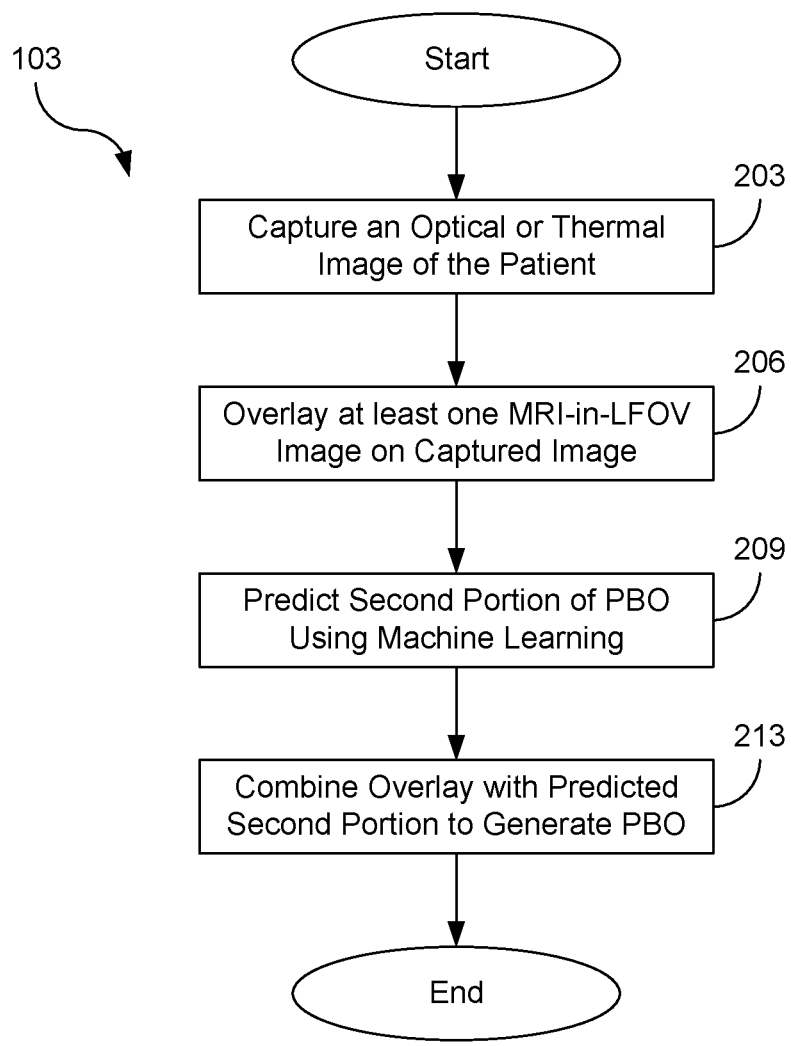
FIG. 2 is a flowchart illustrating one example of functionality implemented according to various embodiments of the present disclosure.

Referring next to FIG. 2, shown is a flowchart that provides one example of a method for implementing various embodiments of the present disclosure. For example, the flowchart of FIG. 2 could be implemented as a method for performing the operations of block 103 of FIG. 1.

Beginning with block 203, one or more images of the patient can be captured using an appropriate image capture device, such as a camera. The images could be captured using an optical or thermal camera. Optical images of the patient may be captured due to the wide availability of optical cameras. However, thermal images may be captured in situations where a portion of the body of the patient is blocked or obscured from view (e.g., due to the patient being covered by a sheet). Throughout the rest of the discussion of FIG. 2, the term "image" is used to describe both optical and thermal images.

Then at block 206, at least one MRI-in-LFOV image captured using the MRI machine in which the patient is located can be overlaid over the image(s) captured at block 203. The result is a first portion of the patient body outline. The combination of the optical and MRI-in-LFOV image can allow for a more detailed depiction of the relative location of the imaged areas of the patient. To improve image accuracy, multiple MRI-in-LFOV images and/or multiple images captured at block 203 can be combined to provide more accurate information.

Next at block 209, a second portion of the PBO can be predicted using various machine-learning approaches. Often, the image(s) captured at block 203 are incomplete due to obstructions of the view of the camera. Examples of obstructions can include patient immobilization devices that block a portion of the body of the patient from the field of view of the camera. These missing portion(s) can be predicted using various machine learning approaches or models (e.g., neural networks, decision tree learning models, etc.).

Then at block 213, the first portion of the PBO generated at block 206 can be combined with the second portion predicted at block 209. The result is the patient body outline, which can be subsequently used at blocks 106 and 109 of the method of FIG. 1.

Figure 3:
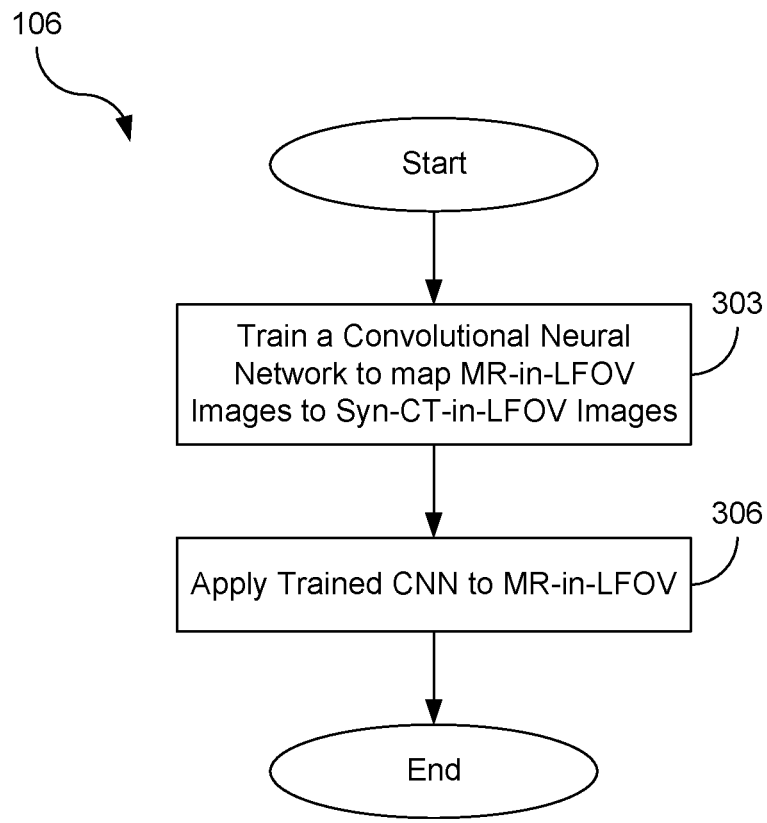
FIG. 3 is a flowchart illustrating one example of functionality implemented according to various embodiments of the present disclosure.

Referring next to FIG. 3, shown is a flowchart that provides one example of a method for implementing various embodiments of the present disclosure. For example, the flowchart of FIG. 3 could be implemented as a method for performing the operations of block 106 of FIG. 1.

Beginning with block 303, a convolutional neural network (CNN) can be trained to map MRI-in-LFOV images into Syn-CT-in-LFOV images. One or more CNNs can be trained to extract a hierarchy of increasingly complex features from an input magnetic resonance image. These extracted features can then be transformed into features for a computed tomography (CT) image. A Syn-CT-in-LFOV image can then be predicted using the CNNs. The predicted Syn-CT-in-LFOV can then be evaluated for accuracy and the result used to train the CNNs.

Then at block 306, the trained CNN(s) can be applied to one or more MRI-in-LFOV images captured from an MRI machine that has imaged a patient. The result will be a respective set of Syn-CT-in-LFOV images, such as those created at block 106 of FIG. 1.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM)

and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A method, comprising:
   obtaining a patient body outline (PBO) of a patient, wherein obtaining the PBO further comprises:
   capturing an optical or thermal image of the patient;
   overlaying at least one image from a magnetic resonance image set in a limited field of view (MRI-in-LFOV) of the patient on the optical or thermal image of the patient to generate a first portion of the PBO;
   predicting a second portion of the PBO using machine-learning, wherein at least one missing portion of the first portion of the PBO is predicted using machine learning; and
   combining the first portion of the PBO and the second portion of the PBO to generate the PBO;

converting the MRI-in-LFOV of the patient into a synthetic computed tomography (CT) image set in limited field of view (syn-CT-in-LFOV) of the patient, wherein converting the MRI-in-LFOV of the patient into the syn-CT-in-LFOV of the patient comprises applying a trained convolutional neural network (CNN) to the MRI-in-LFOV of the patient; and expanding the syn-CT-in-LFOV to a synthetic CT image set in full field of view (syn-CT-in-FFOV) of the patient based at least in part on the PBO.

2. The method of claim 1, wherein converting the MRI-in-LFOV of the patient into the syn-CT-in-LFOV of the patient comprises training the convolutional neural network (CNN) to map images in the MRI-in-LFOV into images in the syn-CT-in-LFOV, wherein the CNN is trained to extract a plurality of features from the images in the MRI-in-LFOV, transform the plurality of features into CT features, and predict the syn-CT-in-LFOV based at least in part on the CT features.

3. The method of claim 1, wherein expanding the syn-CT-in-LFOV to the synthetic CT image set in full field of view (syn-CT-in-FFOV) of the patient further comprises:

training the convolutional neural network (CNN) to map images in the syn-CT-in-LFOV into images in the syn-CT-in-FFOV; and applying the trained CNN to the syn-CT-in-LFOV of the patient.

4. A system, comprising:

a computing device comprising a processor and a memory; and machine-readable instructions stored in the memory that, when executed by the processor, cause the computing device to at least:

obtain a patient body outline (PBO) of a patient, wherein obtaining the PBO further comprises:

capturing an optical or thermal image of the patient;

overlaying at least one image from a magnetic resonance image set in a limited field of view (MRI-in-LFOV) of the patient on the optical or thermal image of the patient to generate a first portion of the PBO;

predicting a second portion of the PBO using machine-learning, wherein at least one missing portion of the first portion of the PBO is predicted using machine-learning; and combining the first portion of the PBO and the second portion of the PBO to generate the PBO;

convert the MRI-in-LFOV of the patient into a synthetic computed tomography (CT) image set in limited field of view (syn-CT-in-LFOV) of the patient, wherein the machine-readable instructions that, when executed by the processor, cause the computing device to convert the MRI-in-LFOV of the patient into the syn-CT-in-LFOV of the patient further cause the computing device to at least apply a trained convolutional neural network (CNN) to the MRI-in-LFOV of the patient; and expand the syn-CT-in-LFOV to a synthetic CT image set in full field of view (syn-CT-in-FFOV) of the patient based at least in part on the PBO.

5. The system of claim 4, wherein the machine-readable instructions that cause the computing device to convert the MRI-in-LFOV of the patient into the syn-CT-in-LFOV of the patient further cause the computing device to at least train the convolutional neural network (CNN) to map images in the MRI-in-LFOV into images in the syn-CT-in-LFOV, wherein the CNN is trained to extract a plurality of features from the images in the MRI-in-LFOV, transform the plurality of features into CT features, and predict the syn-CT-in-LFOV based at least in part on the CT features.

6. The system of claim 4, wherein the machine-readable instructions that cause the computing device to expand the syn-CT-in-LFOV to the synthetic CT image set in full field of view (syn-CT-in-FFOV) of the patient further cause the computing device to at least:

train the convolutional neural network (CNN) to map images in the syn-CT-in-LFOV into images in the syn-CT-in-FFOV; and apply the trained CNN to the syn-CT-in-LFOV of the patient.

7. A non-transitory, computer-readable medium comprising machine-readable instructions that, when executed by the processor, cause the computing device to at least:

obtain a patient body outline (PBO) of a patient, wherein obtaining the PBO further comprises:

capturing an optical or thermal image of the patient;

overlaying at least one image from a magnetic resonance image set in a limited field of view (MRI-in-LFOV) of the patient on the optical or thermal image of the patient to generate a first portion of the PBO;

predicting a second portion of the PBO using machine-learning, wherein at least one missing portion of the first portion of the PBO is predicted using machine-learning; and combining the first portion of the PBO and the second portion of the PBO to generate the PBO;

convert the MRI-in-LFOV of the patient into a synthetic computed tomography (CT) image set in limited field of view (syn-CT-in-LFOV) of the patient, wherein the machine-readable instructions that, when executed by the processor, cause the computing device to convert the MRI-in-LFOV of the patient into the syn-CT-in-LFOV of the patient further cause the computing device to at least apply a trained convolutional neural network (CNN) to the MRI-in-LFOV of the patient; and expand the syn-CT-in-LFOV to a synthetic CT image set in full field of view (syn-CT-in-FFOV) of the patient based at least in part on the PBO.

8. The non-transitory, computer-readable medium of claim 7, wherein the machine-readable instructions that cause the computing device to convert the MRI-in-LFOV of the patient into the syn-CT-in-LFOV of the patient further cause the computing device to at least train the convolutional neural network (CNN) to map images in the MRI-in-LFOV into images in the syn-CT-in-LFOV, wherein the CNN is trained to extract a plurality of features from the images in the MRI-in-LFOV, transform the plurality of features into CT features, and predict the syn-CT-in-LFOV based at least in part on the CT features.

9. The non-transitory, computer-readable medium of claim 7, wherein the machine-readable instructions that cause the computing device to expand the syn-CT-in-LFOV to the syn-CT-in-FFOV of the patient further cause the computing device to at least:

train the convolutional neural network (CNN) to map images in the syn-CT-in-LFOV into images in the syn-CT-in-FFOV; and apply the trained CNN to the syn-CT-in-LFOV of the patient.

10. The method of claim 1, wherein expanding the syn-CT-in-LFOV to the synthetic CT image set in full field of view (syn-CT-in-FFOV) of the patient further comprises:

combining the syn-CT-in-LFOV with the PBO; and applying a machine learning algorithm to the PBO combined with the syn-CT-in-LFOV to obtain the syn-CT-in-FFOV, wherein a missing body generation algorithm applied by the machine learning model predicts one or more missing portions of the PBO that were not imaged by the MRI-in-LFOV or the syn-CT-in-LFOV.

11. The system of claim 4, wherein the machine-readable instructions that cause the computing device to expand the syn-CT-in-LFOV to the synthetic CT image set in full field of view (syn-CT-in-FFOV) of the patient further cause the computing device to at least:

combine the syn-CT-in-LFOV with the PBO; and apply a machine learning algorithm to the PBO combined with the syn-CT-in-LFOV to obtain the syn-CT-in-FFOV, wherein a missing body generation algorithm applied by the machine learning model predicts one or more missing portions of the PBO that were not imaged by the MRI-in-LFOV or the syn-CT-in-LFOV.

12. The non-transitory, computer-readable medium of claim 7, wherein the machine-readable instructions that cause the computing device to expand the syn-CT-in-LFOV to the syn-CT-in-FFOV of the patient further cause the computing device to at least:

combine the syn-CT-in-LFOV with the PBO; and apply a machine learning algorithm to the PBO combined with the syn-CT-in-LFOV to obtain the syn-CT-in-FFOV, wherein a missing body generation algorithm applied by the machine learning model predicts one or more missing portions of the PBO that were not imaged by the MRI-in-LFOV or the syn-CT-in-LFOV.

* * * * *